United States Patent
Yu

(10) Patent No.: US 9,251,563 B2
(45) Date of Patent: Feb. 2, 2016

(54) METHOD FOR ADJUSTING IMAGES DISPLAYED ON DISCRETE SCREENS

(71) Applicant: WISTRON CORP., New Taipei (TW)

(72) Inventor: Ching-Jeng Yu, New Taipei (TW)

(73) Assignee: Wistron Corp., New Taipei (TW)

( * ) Notice: Subject to any disclaimer, the term of this patent is extended or adjusted under 35 U.S.C. 154(b) by 320 days.

(21) Appl. No.: 13/940,067

(22) Filed: Jul. 11, 2013

(65) Prior Publication Data

US 2014/0043368 A1 Feb. 13, 2014

(30) Foreign Application Priority Data

Aug. 7, 2012 (TW) ............................... 101128379 A

(51) Int. Cl.
*G09G 5/00* (2006.01)
*G06T 3/20* (2006.01)
*G06F 3/14* (2006.01)

(52) U.S. Cl.
CPC .............. *G06T 3/20* (2013.01); *G06F 3/1446* (2013.01); *G09G 2300/026* (2013.01); *G09G 2320/02* (2013.01); *G09G 2340/0471* (2013.01)

(58) Field of Classification Search
CPC ................... G09G 2300/026; G09G 2320/02; G09G 2320/04; G09G 2340/04; G09G 2340/0464; G06F 3/1446; G06T 3/20
See application file for complete search history.

(56) References Cited

U.S. PATENT DOCUMENTS

| | | |
|---|---|---|
| 8,095,884 B2 | 1/2012 | Karunakaran et al. |
| 2005/0083331 A1* | 4/2005 | MacKinlay ................... 345/473 |
| 2006/0077544 A1* | 4/2006 | Stark ............................. 359/448 |
| 2008/0143969 A1* | 6/2008 | Aufranc et al. ................. 353/30 |
| 2010/0201645 A1* | 8/2010 | Asami ........................... 345/173 |
| 2011/0102300 A1* | 5/2011 | Wood et al. .................... 345/1.3 |

* cited by examiner

*Primary Examiner* — Michelle L Sams

(57) ABSTRACT

A method for adjusting images displayed on discrete screens of an electronic device is provided. The discrete screens, comprising two displaying areas separated by a non-displaying area, cooperate to display an object. Image data of the two displaying areas is obtained. Whether there is at least one line segment which is parallel to a middle line of the non-displaying area, continuous and longer than a predetermined length is determined in each displaying area respectively. A line segment of the at least one line segment that is closest to the middle line is defined as a base line in each displaying area respectively. A displaying position of the object is adjusted according to distances between base lines and edges of the displaying areas.

10 Claims, 3 Drawing Sheets

METHOD FOR ADJUSTING IMAGES DISPLAYED ON DISCRETE SCREENS

CROSS REFERENCE TO RELATED APPLICATIONS

This application claims priority of Taiwan Patent Application No. 101128379, filed on Aug. 7, 2012, the entirety of which is incorporated by reference herein.

BACKGROUND OF THE INVENTION

1. Field of the Invention

The invention relates to displaying images, and more particularly to adjusting images displayed on discrete screens.

2. Description of the Related Art

As the technology has developed, the variety of types of electronic devices has increased, such as electronic devices with multiple display screens disclosed in Taiwan Patent No. M354778 (Application No. 097216872) and Taiwan Patent No. M361204 (Application No. 097220639). The electronic devices with multiple display screens may use at least two display screens to cooperate to display an image. In this case, an object (such as a form) in the image may be separated by a non-displaying area between the display screens, thereby causing inconvenience to the user when reading. For example, FIG. 1A illustrates a block diagram of an electronic device 10 having two screens which cooperate to display images. The electronic device 10 comprises screens 110 and 112, and the screens 110 and 112 are separated by a non-displaying area 130. When the screens 110 and 112 cooperate to display a form 140 as shown in FIG. 1B, a column 142 between vertical lines (grid lines) A and B of the form 140 may be cut off by the non-displaying area 130, as shown in FIG. 1A, thereby causing the visual difficulty in reading the text in the column 142 and the inconvenience to the user.

BRIEF SUMMARY OF THE INVENTION

In view of this, the present disclosure provides a method for adjusting displayed images to determine whether there is any feature being separated by a non-displaying area when discrete screens cooperate to display an object and adjust a displaying position of the object when there is a feature of the object being separated by the non-displaying area, so as to avoid the visual difficulty caused by the discontinuous feature.

An embodiment of the invention provides a method for adjusting images displayed on discrete screens of an electronic device, wherein the discrete screens comprises a first display area and a second display area, the first display area and the second display area are separated by a non-displaying area, a middle line of the non-displaying area is parallel to a first side of the first display area, which connects the first display area to the non-displaying area, and a second side of the second display area, which connects the second display area to the non-displaying area, the first display area and the second display area cooperate to display an object, and the method comprising: obtaining first image data of the first display area and second image data of the second display area; determining, according to the first image data, whether there is at least one first line segment which is parallel to the middle line, continuous and longer than a predetermined length, wherein one of the at least one first line segment, which is the closest to the middle line, is a first baseline segment, and a distance between the first baseline segment and the first side is a first distance; determining, according to the second image data, whether there is at least one second line segment which is parallel to the middle line, continuous and longer than the predetermined length, wherein one of the at least one second line segment, which is the closest to the middle line, is a second baseline segment, and a distance between the second baseline segment and the second side is a second distance; comparing the first distance and the second distance; and adjusting a displaying position of the object according to a comparison result of comparing the first distance and the second distance.

Another embodiment of the invention provides a computer product embodied in a non-transitory computer-readable medium, wherein when the computer product is loaded into and executed by an electronic device having discrete screens, the electronic device practices a method for adjusting images displayed on the discrete screens, wherein the discrete screens comprises a first display area and a second display area, the first display area and the second display area are separated by a non-displaying area, a middle line of the non-displaying area is parallel to a first side of the first display area, which connects the first display area to the non-displaying area, and a second side of the second display area, which connects the second display area to the non-displaying area, the first display area and the second display area cooperate to display an object, and the computer product comprising: a first program code for obtaining first image data of the first display area and second image data of the second display area; a second program code for determining, according to the first image data, whether there is at least one first line segment which is parallel to the middle line, continuous and longer than a predetermined length, wherein one of the at least one first line segment, which is the closest to the middle line, is a first baseline segment, and a distance between the first baseline segment and the first side is a first distance; a third program code for determining, according to the second image data, whether there is at least one second line segment which is parallel to the middle line, continuous and longer than the predetermined length, wherein one of the at least one second line segment, which is the closest to the middle line, is a second baseline segment, and a distance between the second baseline segment and the second side is a second distance; a fourth program code for comparing the first distance and the second distance; and a fifth program code for adjusting a displaying position of the object according to a comparison result of comparing the first distance and the second distance.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
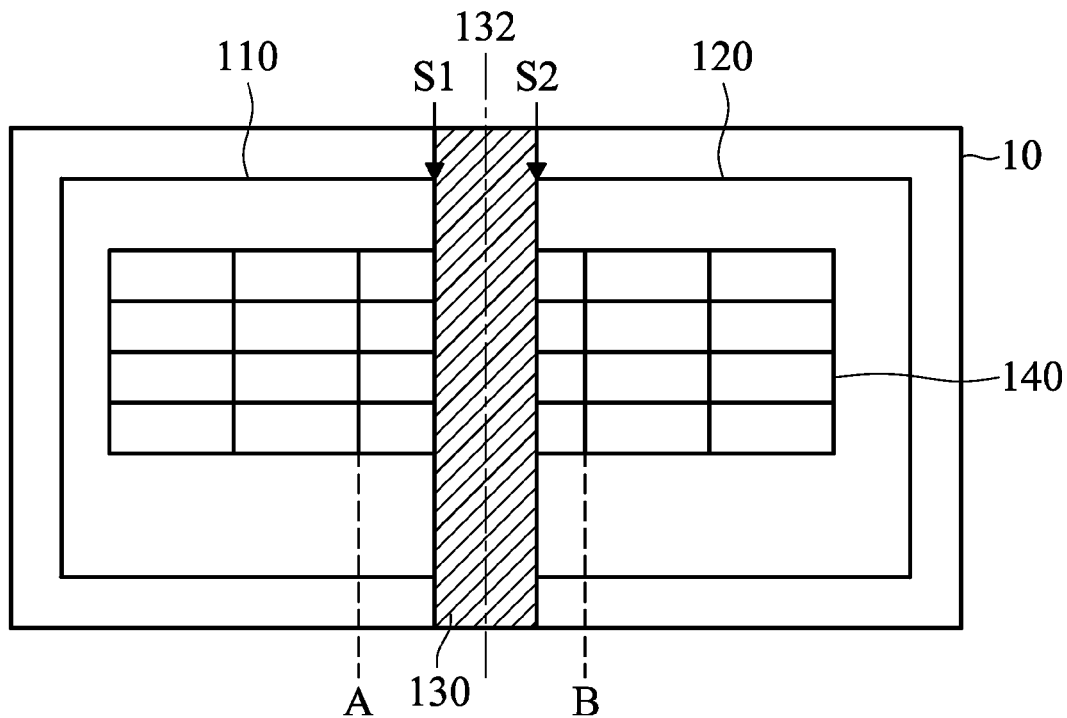
FIG. 1A illustrates a block diagram of an electronic device having two screens which cooperate to display images.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "closer," "farther," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

Figure 1B:
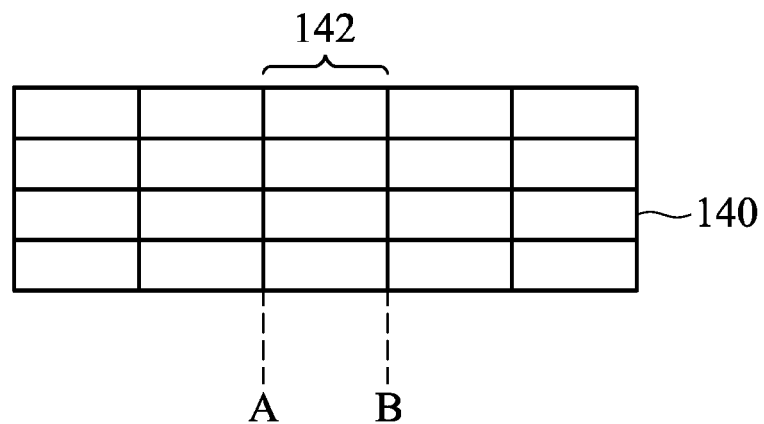
FIG. 1B illustrates a block diagram of a form.

FIG. 1A illustrates a block diagram of an electronic device 10 having two screens 110 and 120 which cooperate to display images. The screens 110 and 120 are separated by a non-displaying area 130. A side S1 of the screen 110 connects the screen 110 to the non-displaying area 130, a side S2 of the screen 120 connects the screen 120 to the non-displaying area 130, and a middle line 132 of the non-displaying area 130 is parallel to the sides S1 and S2. The non-displaying area 130 may be a part of the housing of the electronic device 10 or a rotating axle or any other combining component that connects the screens 110 and 120 together. When the screens 110 and 120 cooperate to display an object, such as a form 140 shown in FIG. 1B, a column 142 between vertical lines A and B of the form 140 may be cut off by the non-displaying area 130. It is noted that the invention is applied to an electronic device having discrete screens. The discrete screens refer to display areas (such as the screens 110 and 120) any two of which are separated by a non-displaying area (such as the non-displaying area 130).

Figure 2:
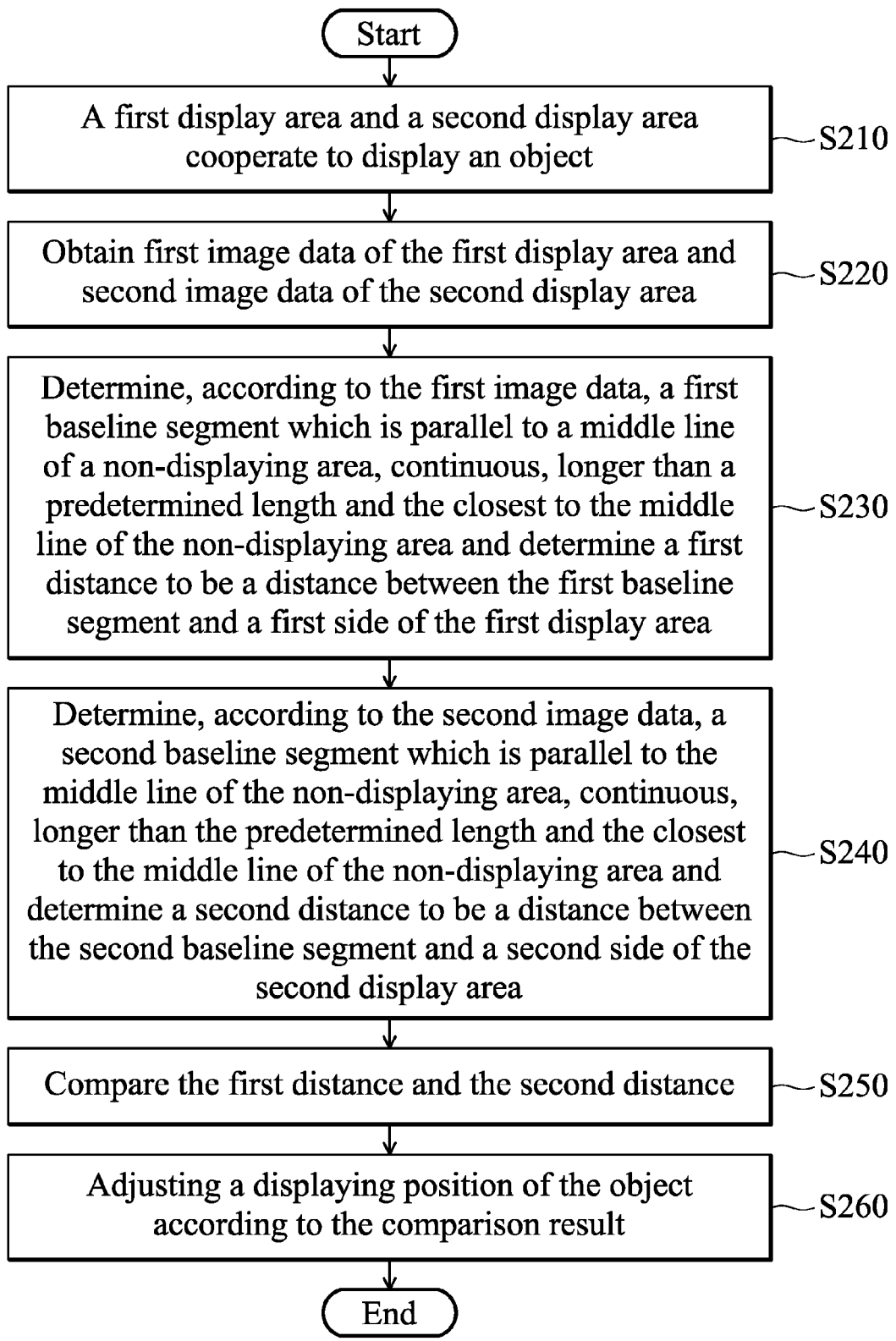
FIG. 2 illustrates a flow chart of a method for adjusting images displayed on discrete screens of an electronic device according to an embodiment of the invention.

For avoiding situation described above, FIG. 2 illustrates a flow chart of a method for adjusting images displayed on discrete screens of an electronic device according to an embodiment of the invention. First, in step S210, a first display area (such as the screen 110 in FIG. 1A) and a second display area (such as the screen 120 in FIG. 1A) cooperate to display an object (such as the form 140 in FIG. 1B). Then, in step S220, in the case where the first display area and the second display area cooperate to display the object, first image data of the first display area and second image data of the second display area are obtained. The first image data of the first display area is pixel data corresponding to the first display area, such as a matrix of pixel values that corresponds to the first display area. The second image data of the second display area is pixel data corresponding to the second display area, such as a matrix of pixel values that corresponds to the second display area.

Figure 3:
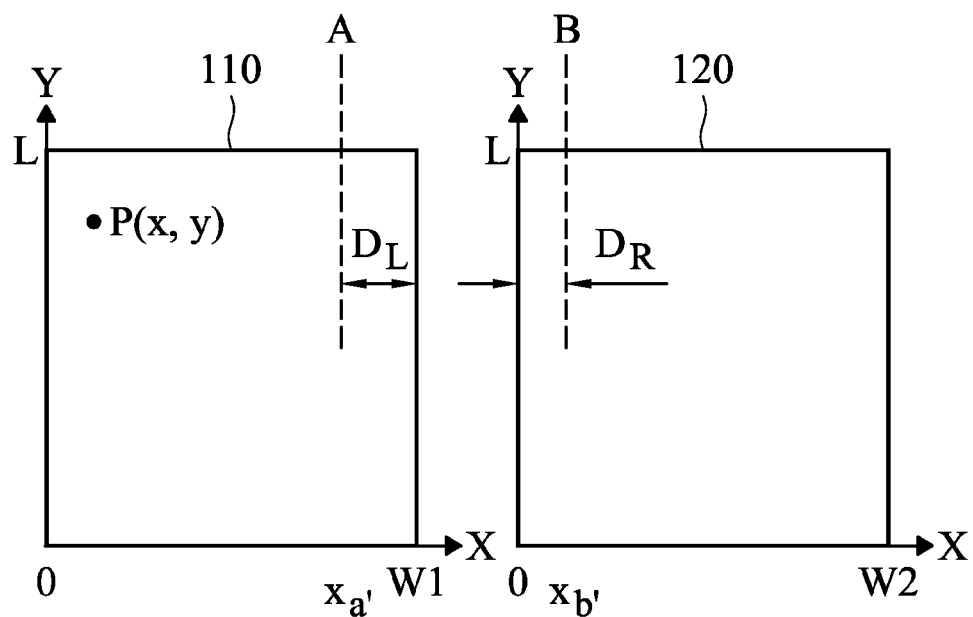
FIG. 3 illustrates a block diagram of calculation of a first distance and a second distance.

In step S230, a first baseline segment which is parallel to a middle line of the non-displaying area, continuous, longer than a predetermined length and the closest to the middle line of the non-displaying area (such as the vertical line A in FIG. 1A) is determined according to the first image data, and a distance between the first baseline segment and a first side of the first display area (such as the side S1 in FIG. 1A) is determined to be a first distance, such as the first distance $D_L$ in FIG. 3. To be more detailed, in step S230, firstly, whether there is at least one first line segment being parallel to the middle line, continuous and longer than the predetermined length is determined according to the first image data, and then, one of the at least one first line segment, which is the closest to the first side, is determined to be the first baseline segment.

In step S240, a second baseline segment which is parallel to the middle line of the non-displaying area, continuous, longer than the predetermined length and the closest to the middle line of the non-displaying area (such as the vertical line B in FIG. 1A) is determined according to the second image data, and a distance between the second baseline segment and a second side of the second display area (such as the side S2 in FIG. 1A) is determined to be a second distance, such as the second distance $D_R$ in FIG. 3. To be more detailed, in step S240, firstly, whether there is at least one second line segment being parallel to the middle line, continuous and longer than the predetermined length is determined according to the second image data, and then, one of the at least one second line segment, which is the closest to the second side, is determined to be the second baseline segment.

Figure 4:
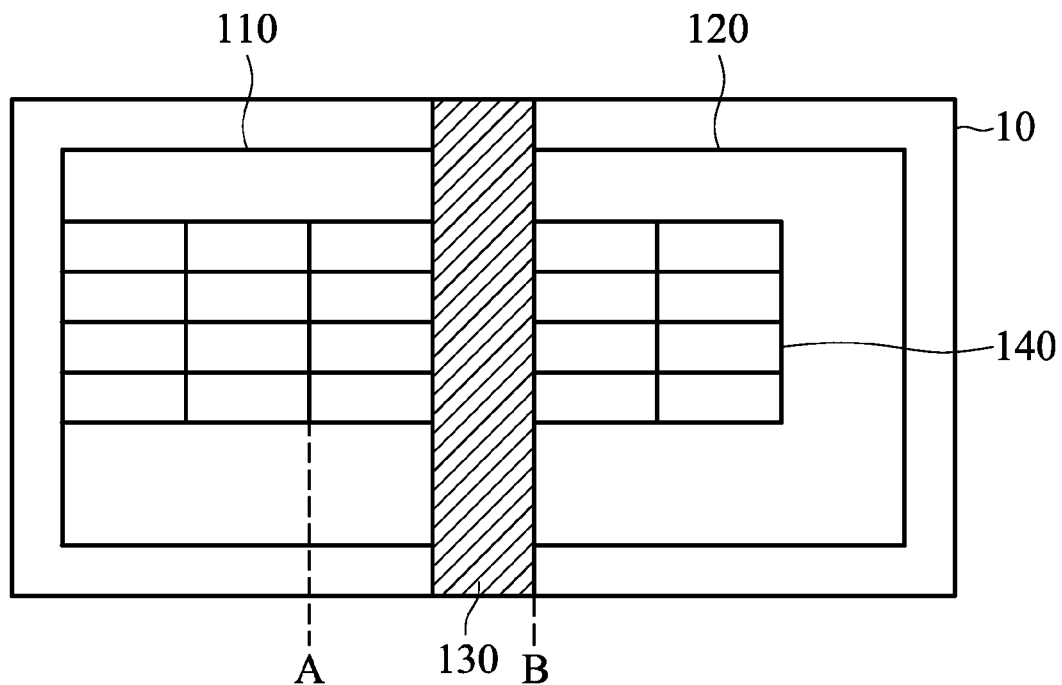
FIG. 4 illustrates a block diagram of an electronic device after a method for adjusting images displayed on discrete screens of the electronic device is performed according to an embodiment of the invention.

After the first distance and the second distance are determined, in step S250, the first distance and the second distance are compared. When the first distance is smaller than the second distance, a displaying position of the object is shifted toward the second display region by the first distance. When the second distance is smaller than the first distance, the displaying position of the object is shifted toward the first display area by the second distance. An example of shifting the displaying position of the object will be explained with references to FIG. 3 and FIG. 4. In FIG. 3, a simplified block diagram of FIG. 1, only the screens 110 and 120 and the vertical lines A and B of the form 140 are shown and the others are neglected for brevity. As shown in FIG. 3, after comparing the first distance $D_L$ and the second distance $D_R$, it is determined that the second distance $D_R$ is smaller than the first distance $D_L$. Therefore, the displaying position of the form 140 is shifted toward the screen 110 by the second distance $D_R$, thereby making the column 142 between the vertical lines A and B able to be wholly displayed on the screen 110, as shown in FIG. 4 and thus solving the visual difficulty as shown in FIG. 1A. In another embodiment, if the first distance is equal to the second distance, the displaying position of the object can be shifted toward the first display area or the second displayed area. In another embodiment, the displaying position of the object can be shifted based on distances between the object and edges of the display areas in addition to the comparison result of the first distance and the second distance. For example, as shown in FIG. 3, the displaying position of the form 140 is shifted toward left by the second distance $D_R$ according to the comparison result of the first distance $D_L$ and the second distance $D_R$. However, if the distance between the left edge (the leftmost vertical line) of the form 140 and the left edge of the screen 110 is smaller than the second distance $D_R$, the leftmost column of the form 140 may not be able to be wholly displayed on the screen 110 after the displaying position of the form 140 is shifted toward left by the second distance $D_R$. In this case, if the distance between the right edge (the rightmost vertical line) of the form 140 and the right edge of the screen 120 is larger than or equal to the first distance $D_L$, the displaying position of the form 140 can be shifted toward right by the first distance $D_L$ instead, thereby making the column 142 wholly displayed on the screen 120. The adjustment of the displaying position of the object is not limited to the embodiments described above. Those skilled in the art can modify the adjustment of the displaying position of the object according to the above embodiments.

Determination of the first distance and the second distance in steps S230 and S240 is further explained in the following with the reference to FIG. 3. In the embodiment, the screen 110 is defined as a display area having a length W1 along the X-axis and a length L along the Y-axis, and the screen 120 is defined as a display area having a length W3 along the X-axis and a length L along the Y-axis. The side S1 is parallel to the Y-axis and the X-axis coordinate of the side S1 is W1. The side S2 is parallel to the Y-axis and the X-axis coordinate of the side S2 is 0. P(x,y) denotes a pixel whose X-axis coordinate and Y-axis coordinate are x and y, respectively, and A(x,y) denotes a pixel value of the pixel P(x,y). Firstly, a thresholding method is performed on the image data of the screen 110 and the image data of the screen 120. In other words, every pixel value of the image data of the screen 110 and the image data of the screen 120 is set to be 0 or N, wherein N is a positive integer. For example, N can be 1 or 255. If the image data is pixel values of a grayscale image, a threshold value can be determined first. Then, if a pixel value of the image data is larger than or equal to the threshold value, the pixel value is set to be N. If a pixel value of the image data is smaller than the threshold value, the pixel value is set to be 0. In another example, if the image data is pixel values of a color image, such as RBG image data, a conversion method can be performed on the image data first to convert RBG pixel values into grayscale pixel values. Then, a threshold value is determined. After that, a grayscale pixel value is set to be N when the original grayscale pixel value is larger to or equal to the threshold value, and a grayscale pixel value is set to be 0 when the original grayscale pixel value is smaller than the threshold value.

To find the first baseline segment, all X-axis coordinates in the screen 110 where there might be line segments which are parallel to the middle line 132, continuous and longer than the predetermined length have to be determined. A method for determining the X-axis coordinates is to determine whether there is at least one X-axis coordinate $x_a$ at which both a first condition and a second condition are met. The first condition is $$\sum_{y=0}^{y=L} \frac{|A(x_a, y) - A((x_a - 1), y)|}{N} > \frac{L}{D},$$

and the second condition is $$\sum_{y=y_r}^{y=y_r+\frac{L}{D}} \frac{A(x_a, y)}{N} > \frac{L}{D} \cdot A(x, y)$$

is a binary pixel value of a pixel in the screen 110 whose X-axis coordinate and Y-axis coordinate are x and y, respectively. $y_r$ is a random Y-axis coordinate. D is a predetermined positive integer. (L/D) refers to the predetermined length described above.

The first condition is used to determine X-axis coordinates where there are line segments parallel to the middle line. If the first condition is met at an X-axis coordinate, it means there is a line segment parallel to the middle line at the X-axis coordinate. Since there is possibility that the line segment might be a dotted line, the second condition is required to further determine whether the line segment is continuous and longer than the predetermined length (L/D). In an example, the preset value of D is 3. In this case, the second condition is used to determine whether the line segment is continuous and longer than ⅓ of the length along the Y-axis of the screen 110. In one embodiment, D can be adjusted according to the size, the resolution and so on of the screen. In another embodiment, D can be adjusted according to settings of the object itself, such as row spacing. Then, an X-axis coordinate, which is closest to the X-coordinate of the side S1 (that is, W1), is obtained from all the X-axis coordinates $x_a$ where both the first condition and the second condition are met. In other words, the maximum value $x_{a'}$, among the X-axis coordinates $x_a$ is obtained. Accordingly, the first distance $D_L$ is equal to (W1−$x_{a'}$).

To find the second baseline segment, all X-axis coordinates in the screen 120 where there might be line segments which are parallel to the middle line 132, continuous and longer than the predetermined length have to be determined. A method for determining the X-axis coordinates is to determine whether there is at least one X-axis coordinate $x_b$ at which both a third condition and a fourth condition are met. The third condition is $$\sum_{y=0}^{y=L} \frac{|A(x_b, y) - A((x_b - 1), y)|}{N} > \frac{L}{D},$$

and the fourth condition is $$\sum_{y=y_n}^{y=y_n+\frac{L}{D}} \frac{A(x_b, y)}{N} > \frac{L}{D} \cdot A(x, y)$$

is a binary pixel value of a pixel in the screen 120 whose X-axis coordinate and Y-axis coordinate are x and y, respectively. $y_n$ is a random Y-axis coordinate. D is a predetermined positive integer. (L/D) refers to the predetermined length described above.

The third condition, similar to the first condition, is used to determine X-axis coordinates where there are line segments parallel to the middle line. If the first condition is met at an X-axis coordinate, it means there is a line segment parallel to the middle line at the X-axis coordinate. Since there is possibility that the line segment might be a dotted line, the fourth condition is required to further determine whether the line segment is continuous and longer than the predetermined length (L/D). As described above, the preset value of D is 3. In this case, the fourth condition is used to determine whether the line segment is continuous and longer than ⅓ of the length along the Y-axis of the screen 120. In one embodiment, D can be adjusted according to the size, the resolution and so on of the screen. In another embodiment, D can be adjusted according to settings of the object itself, such as row spacing. Then, an X-axis coordinate, which is closest to the X-coordinate of the side S2 (that is, 0), is obtained from all the X-axis coordinates $x_b$ where both the third condition and the fourth condition are met. In other words, the minimum value $x_{b''}$, among the X-axis coordinates $x_b$ is obtained. Accordingly, the second distance $D_R$ is equal to $x_{b''}$.

In one embodiment, when the first condition and the second condition are used to determine the first distance, whether the first condition and the second condition are met is checked starting at $x_a=W1$, and then $x_a$ decreases every time whether the first condition and the second condition are met is checked. In this case, if both the first condition and the second condition are met when $x_a=x_{a'}$, it doesn't have to check whether the first condition and the second condition are met at those X-axis coordinate that are smaller than $x_{a'}$. Therefore, computation time can be reduced. Similarly, when the third condition and the fourth condition are used to determine the second distance, whether the third condition and the fourth condition are met is checked starting at $x_b=0$, and then $x_b$ increases every time whether the third condition and the fourth condition are met is checked. In this case, if both the third condition and the fourth condition are met when $x_b=x_{b''}$, it doesn't have to check whether the third condition and the fourth condition are met at those X-axis coordinate that are larger than $x_{b''}$. Therefore, computation time can be reduced.

In the embodiments described above, the electronic device having two display areas, one of which is configured on the left hand side and the other of which is configured on the right hand side, is used as an example for illustration. However, the invention is not limited thereto. For example, the invention can also be applied to an electronic device having two display areas, one of which is configured on the upper side and the other of which is configured on the lower side or any other electronic device having discrete display areas configured in other directions.

In the embodiments described above, though the form is used as an example of the object which the first display area and the second display area cooperate to display, the invention is not limited thereto. For example, the object can be a picture, a window of an application program, and so on. In addition, the invention can also be applied in the case of aligning windows. For example, when a user drags a window toward an edge of a display area and an edge of the window is very close to or slightly exceeds the edge of the display area, conditions like the first condition and the second condition or the third condition and the fourth condition can be used to determine whether the edge of the window is very close to the edge of the display area and whether the edge of the window slightly exceeds the edge of the display area, a distance between the edge of the window and the edge of the display area can be obtained in the similar way as mentioned above, and then a new displaying position of the window can be determined according to the obtained distance so as to align the edge of the window with the edge of the display area.

As described in the embodiments above, whether there is any feature being separated by a non-displaying area when discrete screens cooperate to display an object can be determined and a displaying position of the object can be adjusted based on the determination so as to avoid the visual difficulty caused by the discontinuous feature.

Methods and systems of the present disclosure, or certain aspects or portions of embodiments thereof, may take the form of a program code (i.e., instructions) embodied in media, such as floppy diskettes, CD-ROMS, hard drives, firmware, or any other non-transitory machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

An embodiment of the invention provides a computer product embodied in a non-transitory computer-readable medium, wherein when the computer product is loaded into and executed by an electronic device having discrete screens, the electronic device practices a method for adjusting images displayed on the discrete screens, wherein the discrete screens comprises a first display area and a second display area, the first display area and the second display area are separated by a non-displaying area, a middle line of the non-displaying area is parallel to a first side of the first display area, which connects the first display area to the non-displaying area, and a second side of the second display area, which connects the second display area to the non-displaying area, the first display area and the second display area cooperate to display an object, and the computer product comprising: a first program code for obtaining first image data of the first display area and second image data of the second display area; a second program code for determining, according to the first image data, whether there is at least one first line segment which is parallel to the middle line, continuous and longer than a predetermined length, wherein one of the at least one first line segment, which is the closest to the middle line, is a first baseline segment, and a distance between the first baseline segment and the first side is a first distance; a third program code for determining, according to the second image data, whether there is at least one second line segment which is parallel to the middle line, continuous and longer than the predetermined length, wherein one of the at least one second line segment, which is the closest to the middle line, is a second baseline segment, and a distance between the second baseline segment and the second side is a second distance; a fourth program code for comparing the first distance and the second distance; and a fifth program code for adjusting a displaying position of the object according to a comparison result of comparing the first distance and the second distance. The fifth program code further comprises: a sixth program code for shifting the displaying position of the object toward the second display area by the first distance when the first distance is smaller than the second distance; and a seventh program code for shifting the displaying position of the object toward the first display area by the second distance when the second distance is smaller than the first distance.

In an example, the first display area has a length W1 along a first axis of the first display area and a length L along a second axis of the first display area, the second display area has a length W2 along a first axis of the second display area and a length L along a second axis of the second display area, the first side is configured alone the second axis of the first display area, a first axis coordinate of the first side is W1, the second side is configured alone the second axis of the second display area, and a first axis coordinate of the second side is 0, wherein L, W1, and W2 are positive integers. The computer product further comprises: an eighth program code for performing a thresholding process on the first image data and the second image data to make each pixel value of the first image data and the second image data be 0 or N, wherein N is a positive integer. In the example, the second program code further comprises: a ninth program code for determining, according to the first image data after the thresholding process, whether there is at least one first axis coordinate $x_a$ at which both a first condition and a second condition are met, wherein the first condition is $$\sum_{y=0}^{y=L} \frac{|A(x_a, y) - A((x_a - 1), y)|}{N} > \frac{L}{D},$$

and the second condition is $$\sum_{y=y_r}^{y=y_r+\frac{L}{D}} \frac{A(x_a, y)}{N} > \frac{L}{D};$$

and a tenth program code for obtaining a maximum value $x_{a,max}$ of the at least one first axis coordinate $x_a$ to make the first distance be $(W1-x_{a,max})$. In the example, the third program code further comprises: an eleventh program code for determining, according to the second image data after the thresholding process, whether there is at least one first axis coordinate $x_b$ at which both a third condition and a fourth condition are met, wherein the third condition is $$\sum_{y=0}^{y=L} \frac{|A(x_b, y) - A((x_b - 1), y)|}{N} > \frac{L}{D},$$

and the fourth condition is $$\sum_{y=y_n}^{y=y_n+\frac{L}{D}} \frac{A(x_b, y)}{N} > \frac{L}{D};$$

and a twelfth program code for obtaining a minimum value $x_{b,min}$ of the at least one first axis coordinate $x_b$ to make the second distance be $x_{b,min}$. $A(x,y)$ is a binary pixel value of a pixel whose first axis coordinate and second axis coordinate are x and y, respectively, $y_r$ is a random second axis coordinate, $y_n$ is a random second axis coordinate, and D is a predetermined positive integer.

In another embodiment, when determining, according to the first image data after the thresholding process, whether there is at least one first axis coordinate $x_a$ at which both the first condition and the second condition are met, whether the first condition and the second condition are met is checked starting at $x_a=W1$, and then $x_a$ is decreased every time whether the first condition and the second condition are met is checked. In addition, when determining, according to the second image data after the thresholding process, whether there is at least one first axis coordinate $x_b$ at which both the third condition and the fourth condition are met, whether the third condition and the fourth condition are met is checked starting at $x_b=0$, and then $x_b$ is increased every time whether the third condition and the fourth condition are met is checked.

While the invention has been described by ways of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for adjusting images displayed on discrete screens of an electronic device, wherein the discrete screens comprises a first display area and a second display area, the first display area and the second display area are separated by a non-displaying area, a middle line of the non-displaying area is parallel to a first side of the first display area, which connects the first display area to the non-displaying area, and a second side of the second display area, which connects the second display area to the non-displaying area, the first display area and the second display area cooperate to display an object, and the method comprising:
    obtaining, by a processor, first image data of the first display area and second image data of the second display area;
    determining, by the processor, at least one first line segment, which is parallel to the middle line, continuous and longer than a predetermined length, in the first image data, wherein one of the at least one first line segment, which is the closest to the middle line, is a first baseline segment, and a distance between the first baseline segment and the first side is a first distance;
    determining, by the processor, at least one second line segment, which is parallel to the middle line, continuous and longer than the predetermined length, in the second image data, wherein one of the at least one second line segment, which is the closest to the middle line, is a second baseline segment, and a distance between the second baseline segment and the second side is a second distance;
    comparing, by the processor, the first distance and the second distance;
    adjusting, by the processor, a displaying position of the object according to a comparison result of comparing the first distance and the second distance; and
    displaying, by the first display area and the second display area in the discrete screens, an image with the adjusted display position of the object cooperatively.

2. The method as claimed in claim 1, further comprising:
    when the first distance is smaller than the second distance, shifting the displaying position of the object toward the second display area by the first distance; and
    when the second distance is smaller than the first distance, shifting the displaying position of the object toward the first display area by the second distance.

3. The method as claimed in claim 2, wherein the first display area has a length W1 along a first axis of the first display area and a length L along a second axis of the first display area, the second display area has a length W2 along a first axis of the second display area and a length L along a second axis of the second display area, the first side is configured alone the second axis of the first display area, a first axis coordinate of the first side is W1, the second side is configured alone the second axis of the second display area, a first axis coordinate of the second side is 0, and L, W1, as well as W2 are positive integers, and the method further comprising:
    performing a thresholding process on the first image data and the second image data to make each pixel value of the first image data and the second image data be 0 or N, wherein N is a positive integer;

determining, according to the first image data after the thresholding process, when there is at least one first axis coordinate $x_a$ at which both a first condition and a second condition are met, wherein the first condition is $$\sum_{y=0}^{y=L} \frac{|A(x_a, y) - A((x_a-1), y)|}{N} > \frac{L}{D},$$

and the second condition is $$\sum_{y=y_r}^{y=y_r+\frac{L}{D}} \frac{A(x_a, y)}{N} > \frac{L}{D};$$

determining, according to the second image data after the thresholding process, when there is at least one first axis coordinate $x_b$ at which both a third condition and a fourth condition are met, wherein the third condition is $$\sum_{y=0}^{y=L} \frac{|A(x_b, y) - A((x_b-1), y)|}{N} > \frac{L}{D},$$

and the fourth condition is $$\sum_{y=y_n}^{y=y_n+\frac{L}{D}} \frac{A(x_b, y)}{N} > \frac{L}{D};$$

obtaining a maximum value $x_{a,max}$ of the at least one first axis coordinate $x_a$; and obtaining a minimum value $x_{b,min}$ of the at least one first axis coordinate $x_b$, wherein A(x,y) is a binary pixel value of a pixel whose first axis coordinate and second axis coordinate are x and y, respectively, $y_r$ is a random second axis coordinate, $y_n$ is a random second axis coordinate, and D is a predetermined positive integer, wherein the first distance is (W1−$x_{a,max}$) and the second distance is $X_{b,min}$.

4. The method as claimed in claim 3, further comprising:
when determining, according to the first image data after the thresholding process, when there is at least one first axis coordinate $x_a$ at which both the first condition and the second condition are met, checking whether the first condition and the second condition are met starting at $x_a$=W1, and then decreasing $x_a$ every time whether the first condition and the second condition are met is checked; and when determining, according to the second image data after the thresholding process, when there is at least one first axis coordinate $x_b$ at which both the third condition and the fourth condition are met, checking whether the third condition and the fourth condition are met starting at $x_b$=0, and then increasing $x_b$ every time whether the third condition and the fourth condition are met is checked.

5. The method as claimed in claim 3, wherein a preset value of D is 3.

6. The method as claimed in claim 3, wherein the object is a form, and the first baseline segment and the second baseline segment are grid lines of the form.

7. A computer product embodied in a non-transitory computer-readable medium, wherein when the computer product is loaded into and executed by an electronic device having discrete screens, the electronic device practices a method for adjusting images displayed on the discrete screens, wherein the discrete screens comprises a first display area and a second display area, the first display area and the second display area are separated by a non-displaying area, a middle line of the non-displaying area is parallel to a first side of the first display area, which connects the first display area to the non-displaying area, and a second side of the second display area, which connects the second display area to the non-displaying area, the first display area and the second display area cooperate to display an object, and the computer product comprising:

a first program code for obtaining first image data of the first display area and second image data of the second display area;

a second program code for determining at least one first line segment, which is parallel to the middle line, continuous and longer than a predetermined length, in the first image data, wherein one of the at least one first line segment, which is the closest to the middle line, is a first baseline segment, and a distance between the first baseline segment and the first side is a first distance;

a third program code for determining at least one second line segment, which is parallel to the middle line, continuous and longer than the predetermined length, in the second image data, wherein one of the at least one second line segment, which is the closest to the middle line, is a second baseline segment, and a distance between the second baseline segment and the second side is a second distance;

a fourth program code for comparing the first distance and the second distance; and a fifth program code for adjusting a displaying position of the object according to a comparison result of comparing the first distance and the second distance.

8. The computer product as claimed in claim 7, wherein the fifth program code further comprises:

a sixth program code for shifting the displaying position of the object toward the second display area by the first distance when the first distance is smaller than the second distance; and a seventh program code for shifting the displaying position of the object toward the first display area by the second distance when the second distance is smaller than the first distance.

9. The computer product as claimed in claim 8, wherein the first display area has a length W1 along a first axis of the first display area and a length L along a second axis of the first display area, the second display area has a length W2 along a first axis of the second display area and a length L along a second axis of the second display area, the first side is configured alone the second axis of the first display area, a first axis coordinate of the first side is W1, the second side is configured alone the second axis of the second display area, a first axis coordinate of the second side is 0, and L, W1, as well as W2 are positive integers, and the computer product further comprising:

an eighth program code for performing a thresholding process on the first image data and the second image data to make each pixel value of the first image data and the second image data be 0 or N, wherein N is a positive integer, wherein the second program code further comprises:

a ninth program code for determining, according to the first image data after the thresholding process, when there is at least one first axis coordinate $x_a$ at which both a first condition and a second condition are met, wherein the first condition is $$\sum_{y=0}^{y=L} \frac{|A(x_a, y) - A((x_a - 1), y)|}{N} > \frac{L}{D},$$

and the second condition is $$\sum_{y=y_r}^{y=y_r+\frac{L}{D}} \frac{A(x_a, y)}{N} > \frac{L}{D};$$

and a tenth program code for obtaining a maximum value $x_{a,max}$ of the at least one first axis coordinate $x_a$ to make the first distance be $(W1-x_{a,max})$;

wherein the third program code further comprises:

an eleventh program code for determining, according to the second image data after the thresholding process, when there is at least one first axis coordinate $x_b$ at which both a third condition and a fourth condition are met, wherein the third condition is $$\sum_{y=0}^{y=L} \frac{|A(x_b, y) - A((x_b - 1), y)|}{N} > \frac{L}{D},$$

and the fourth condition is $$\sum_{y=y_n}^{y=y_n+\frac{L}{D}} \frac{A(x_b, y)}{N} > \frac{L}{D};$$

and a twelfth program code for obtaining a minimum value $x_{b,min}$ of the at least one first axis coordinate $x_b$ to make the second distance be $X_{b,min}$, wherein $A(x,y)$ is a binary pixel value of a pixel whose first axis coordinate and second axis coordinate are x and y, respectively, $y_r$ is a random second axis coordinate, $y_n$ is a random second axis coordinate, and D is a predetermined positive integer.

10. The computer product as claimed in claim 8, wherein:

when determining, according to the first image data after the thresholding process, when there is at least one first axis coordinate $x_a$ at which both the first condition and the second condition are met, checking whether the first condition and the second condition are met starting at $x_a$=W1, and then decreasing $x_a$ every time whether the first condition and the second condition are met is checked; and when determining, according to the second image data after the thresholding process, when there is at least one first axis coordinate $x_b$ at which both the third condition and the fourth condition are met, checking whether the third condition and the fourth condition are met starting at $x_b$=0, and then increasing $x_b$ every time whether the third condition and the fourth condition are met is checked.

* * * * *